A. B. DRÄGER.
DEVICE FOR PREVENTING THE IGNITION OF PRESSURE REDUCING VALVES.
APPLICATION FILED MAY 23, 1910.
970,024. Patented Sept. 13, 1910.
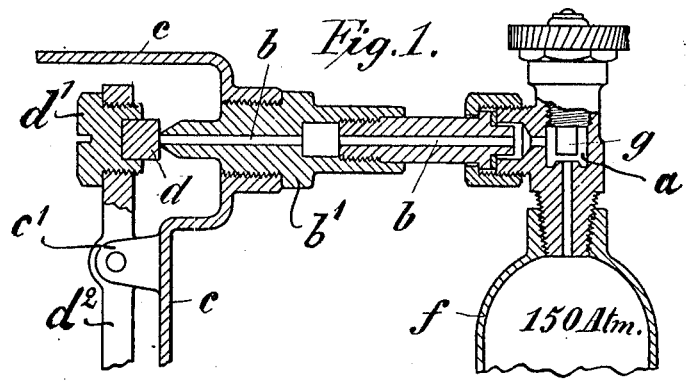
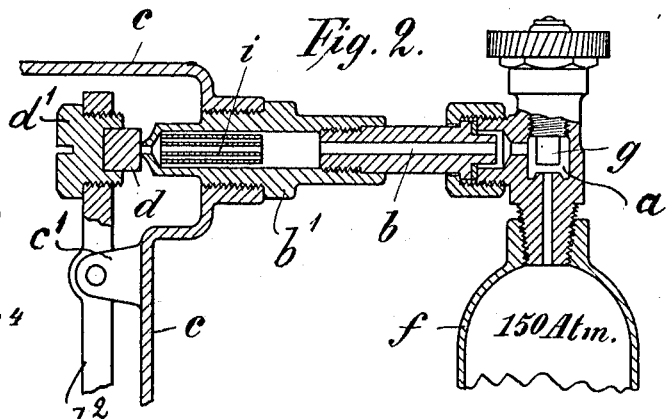
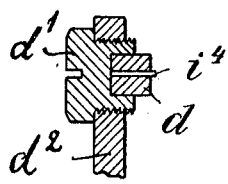
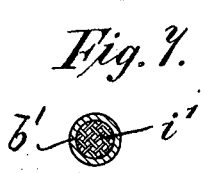
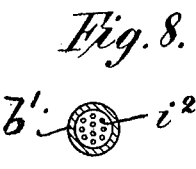
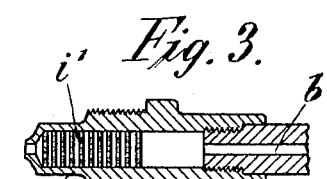
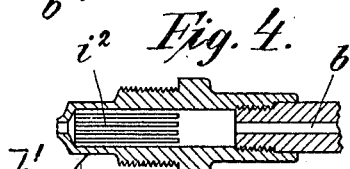
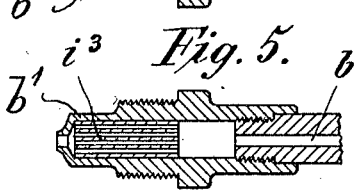
Witnesses
B. Sommers
May Ellis.
Inventor,
Alexander Bernhard Dräger
By _____ Atty.

UNITED STATES PATENT OFFICE.

ALEXANDER BERNHARD DRÄGER, OF LÜBECK, GERMANY.

DEVICE FOR PREVENTING THE IGNITION OF PRESSURE-REDUCING VALVES.

970,024.  Specification of Letters Patent.  Patented Sept. 13, 1910.

Application filed May 23, 1910. Serial No. 562,887.

*To all whom it may concern:*

Be it known that I, ALEXANDER BERNHARD DRÄGER, a subject of the German Emperor, and resident of Lübeck, Germany, have invented a certain new and useful Device for Preventing the Ignition of Pressure-Reducing Valves, of which the following is a specification.

The present invention relates to an improved device for preventing the ignition of the valve plate of vulcanite or the like in pressure reducing or similar valves for compressed gases, such as oxygen.

According to the present invention the object aimed at is attained by withdrawing or absorbing the heat produced by the sudden compression of the gas (air or a mixture of air and oxygen), contained in the gas passage between the usual screw plug of the gas or oxygen cylinder and the valve plate of the pressure reducing valve, by the pressure gas rushing out of the gas cylinder on opening the screw plug valve of the latter.

The invention of neutralizing the produced heat consists in arranging or mounting in the gas passage through which the pressure gas passes into the pressure reducing valve, preferably in the neighborhood of the valve plate of the pressure reducing valve, a cooling body of a suitable mass or material adapted to absorb heat and having as great a surface area as possible.

In the accompanying drawing: Figure 1 is a sectional elevation of the usual arrangement without a heat absorbing body in the gas passage. Fig. 2 is a sectional elevation of the novel arrangement with a heat absorbing body in the gas passage. Figs. 3, 4 and 5 are partial sectional views illustrating three modifications. Figs. 6, 7, 8 and 9 are partial cross sectional views of the Figs. 2, 3, 4 and 5 correspondingly. Fig. 10 is a partial sectional view of a still further modification. The valves in Figs. 1 and 2 are shown in opened position and only so much of the gas cylinder and pressure reducing valve is shown as is necessary for a clear understanding of the invention.

Similar letters of reference refer to similar parts throughout the figures.

In Fig. 1 $f$ designates a gas cylinder fitted with the usual screw plug valve $g$ from which the gas can pass out through the gas passage $b$ the outlet end of which is controlled by a pressure reducing valve body $d^1$ having a valve part $d$ of vulcanite or like inflammable material, mounted in one end of a controlling lever $d^2$ which is pivoted in a bracket $c^1$ of the pressure reducing valve casing $c$ screwed on the gas discharge conduit $b^1$.

If the valve $g$ be opened suddenly, the highly compressed oxygen rushes into the spaces $a$ and $b$ and acting as a piston without mixing with the gaseous contents of these spaces, compresses these gaseous contents of ordinary temperature and atmospheric pressure suddenly and considerably at the farthest end of the passage that is to say at the very spot where the inflammable plate $d$ is situated, so that a very great heat is produced and concentrated suddenly in the extremely small space aforesaid. Now this increase in temperature which causes or produces the ignition of the plate $d$, can be neutralized by absorbing or withdrawing the heat by means of a suitable cooling body inserted into the gas passage $b$. According to the example shown in Figs. 2 and 6 the cooling body consists of a strip of wire-gauze $i$ loosely wound up around itself and placed into the passage $b$. The cooling body $i$ has to answer a double purpose. In the first place the great superficial area of mass of the body $i$ shall give the possibility, that the heated gas pressed through the free spaces or channels of the body $i$ and contacting the latter meets with a great number of cooling surfaces, secondly the bulk or weight of the cooling body shall produce the possibility that the amount of heat present in the heated gas (air or oxygen) increases but slightly the temperature of the mass of the cooling body. When electing the material of the cooling body the materials being good heat conductors must be preferred.

In the modification shown by Figs. 3 and 7 the cooling body is composed of a series of perforated disks or sieve plates $i^1$ placed in juxtaposition some distance apart.

In the modification disclosed by Figs. 4 and 8 the cooling body consists of a fagot of thin rods or sticks $i^2$ and in the modification illustrated in Figs. 5 and 9 the cooling body consists of a cartridge like block $i^3$ provided with a plurality of longitudinal perforations or channels.

As the ignition of the valve plate $d$ starts from the center or middle part of this plate it will be sufficient to protect this place of the plate against the attack of the heated gas. This may be effected in the manner shown by Fig. 10 by perforating the plate $d$ and inserting therein a cooling body, for example, a metal pin $i^4$ or the like.

As many changes may be made in the construction and arrangement of the cooling body without involving a departure from the spirit of my invention, I would have it understood, that I do not limit myself to the exact constructions shown and described, but consider myself at liberty to make such changes and alterations as fall within the scope of my invention.

I claim:

1. In a device of the character described, the combination with a pressure chamber having an outlet passage and a pressure reducing valve controlling the latter, of a heat absorbing and gas sub-dividing device mounted in said outlet passage.

2. In a device of the character described, the combination with a pressure chamber having an outlet passage and a pressure reducing valve controlling the latter, of a foraminous body mounted in said outlet passage.

3. In a device of the character described, the combination with a pressure chamber having an outlet passage and a pressure reducing valve controlling the latter, of a foraminous heat absorbing body mounted in said outlet passage.

4. In a device of the character described, the combination with a pressure chamber having an outlet passage and a pressure reducing valve controlling the latter, of a strip of wire gauze mounted in said outlet passage.

5. In a device of the character described, the combination with a pressure chamber having an outlet passage and a pressure reducing valve controlling the latter, of a spiral strip of wire gauze mounted in said passage.

6. In a device of the character described, the combination with a pressure chamber having an outlet passage and a pressure reducing valve controlling the latter, of a heat absorbing and gas subdividing device mounted in said outlet passage, and a cooling member mounted in the valve.

7. In a device of the character described, the combination with a pressure chamber having an outlet passage and a pressure reducing valve controlling the latter, of a heat absorbing and gas subdividing device mounted in said outlet passage and a metallic pin mounted in the valve.

ALEXANDER BERNHARD DRÄGER.

Witnesses:
 JOHS WULF,
 JACOB BILLFELDS.